Oct. 14, 1952     E. K. SMITH, JR., ET AL     2,613,375
APPARATUS FOR GLUING-OFF AND END SHEET PASTING
Filed Dec. 17, 1948     12 Sheets-Sheet 2
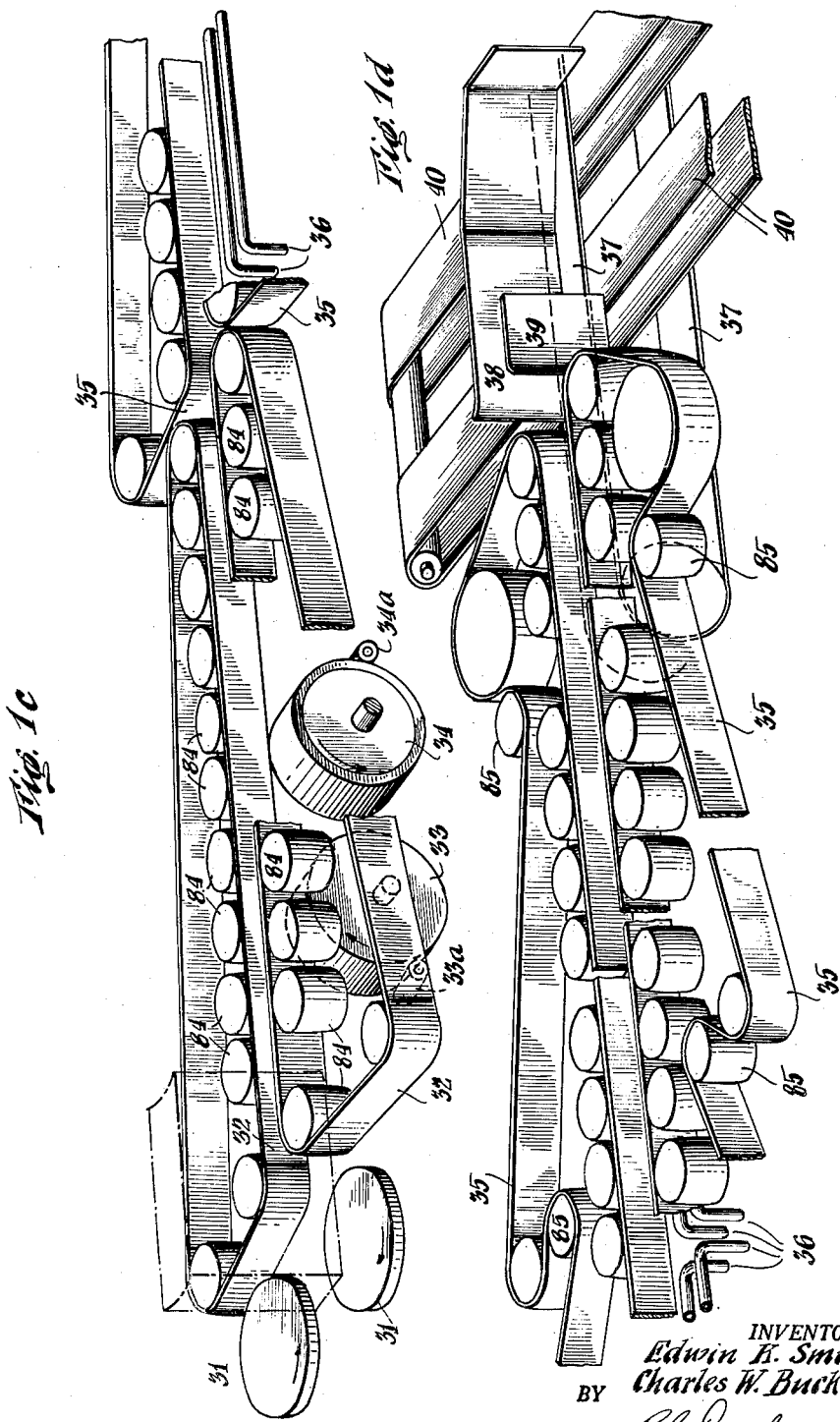
INVENTORS
Edwin K. Smith, Jr.
Charles W. Buckley
BY
R. J. Dearborn
ATTORNEY

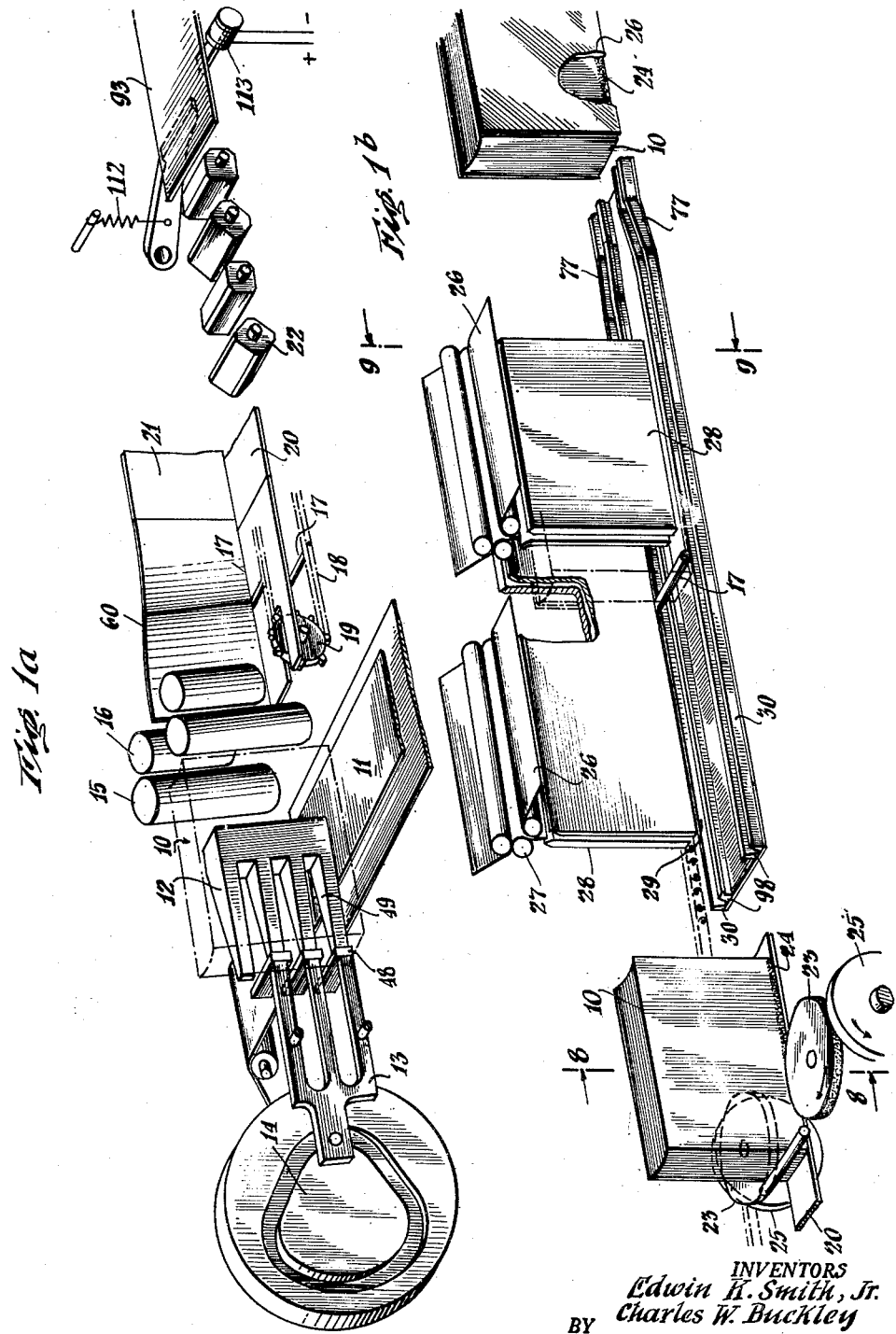

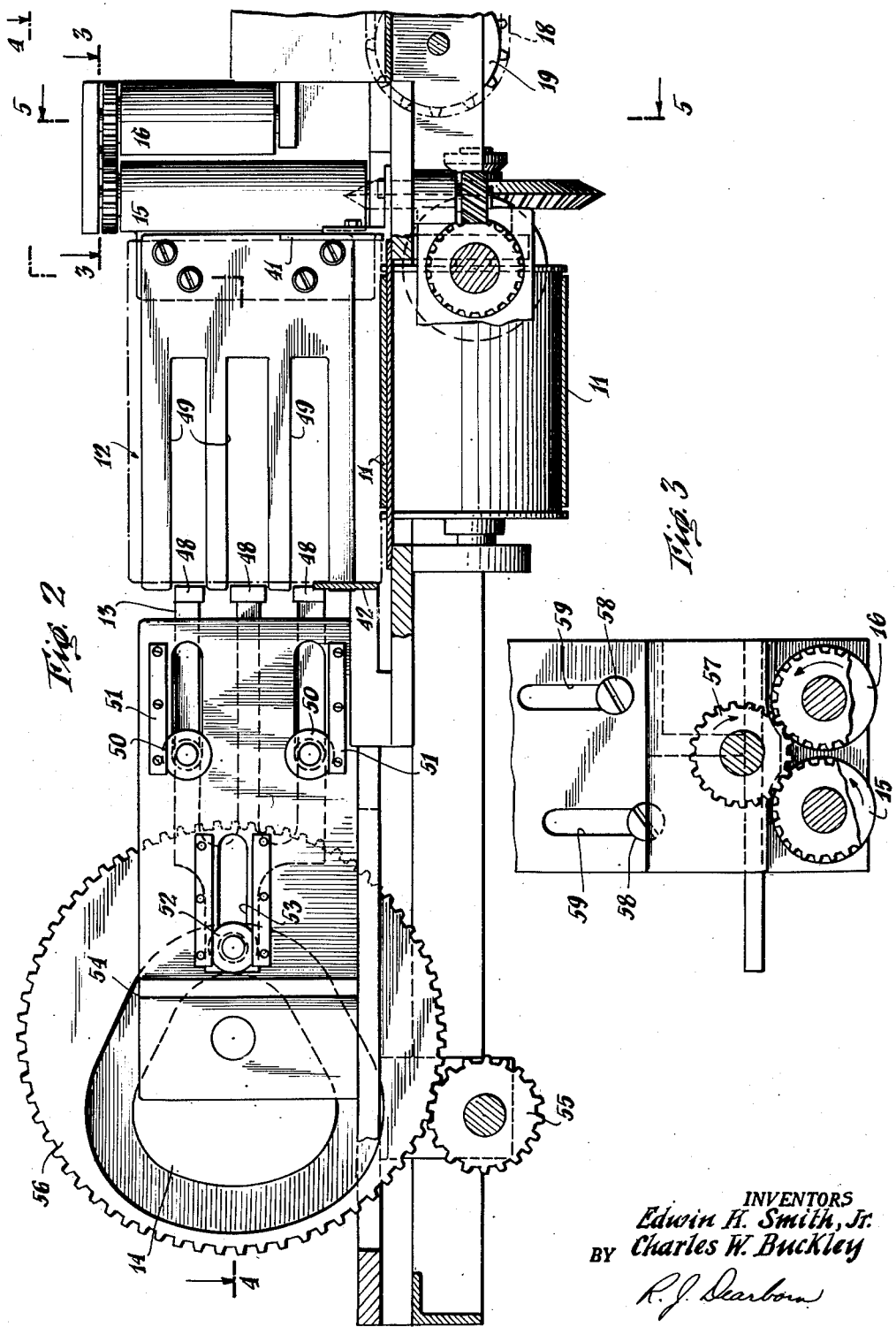

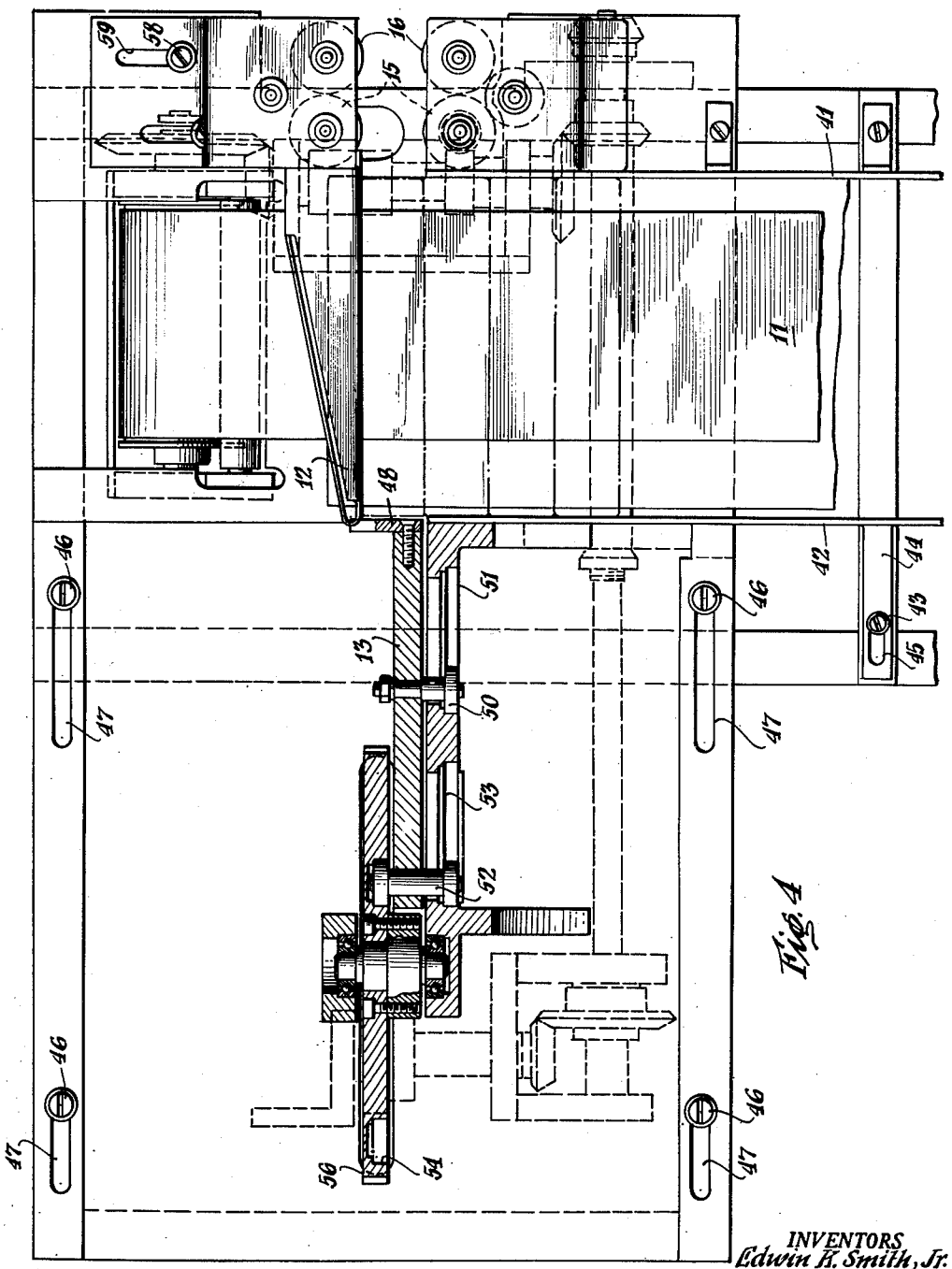

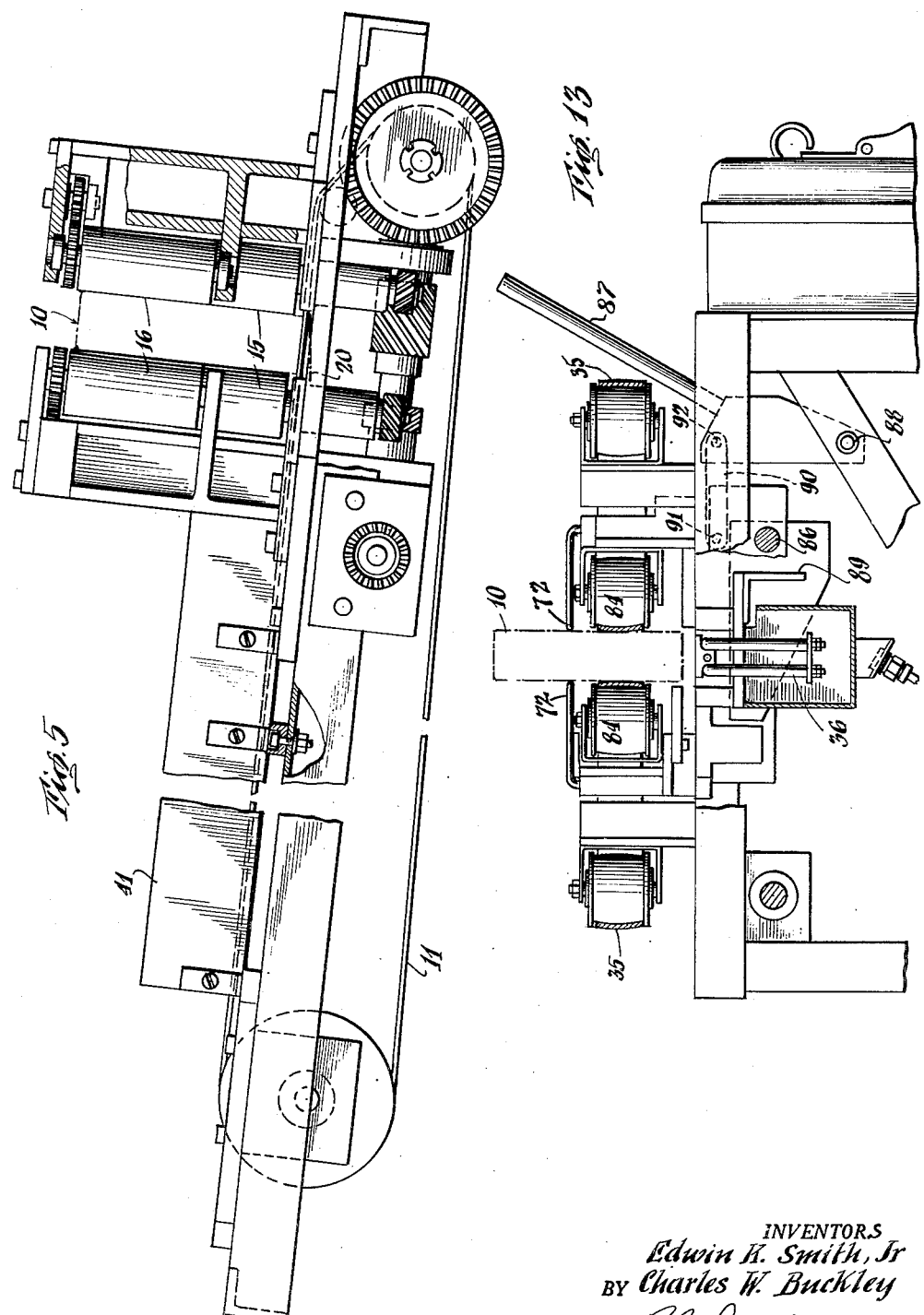

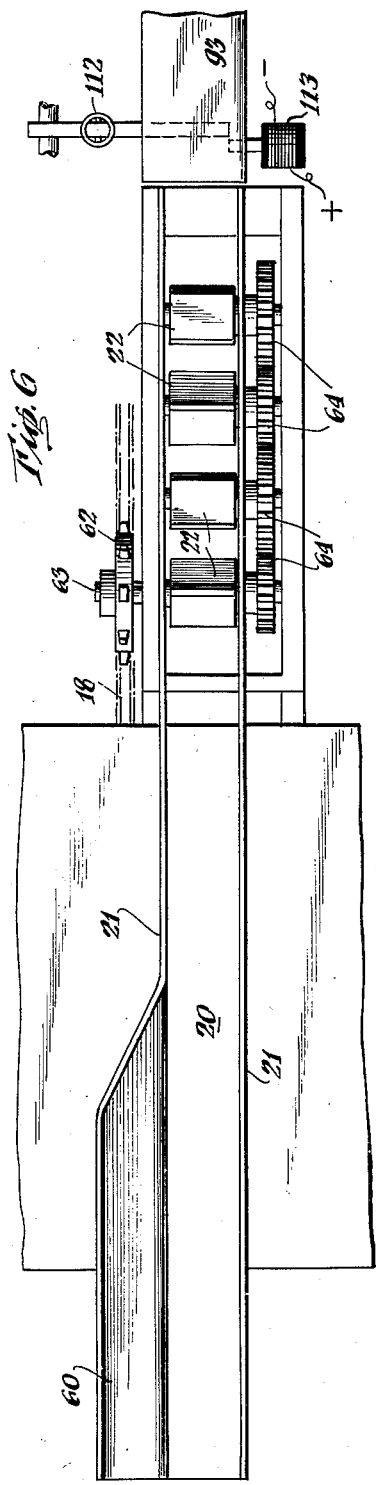
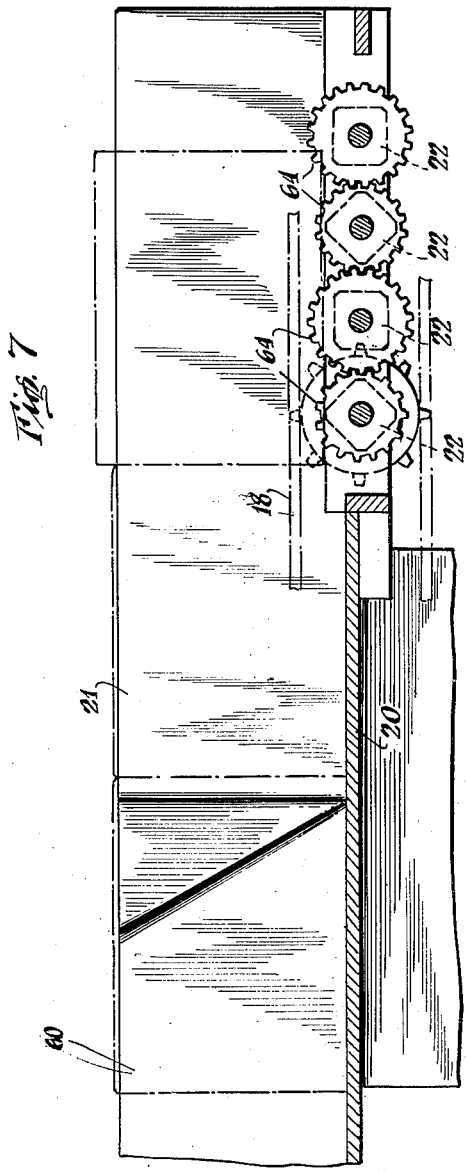

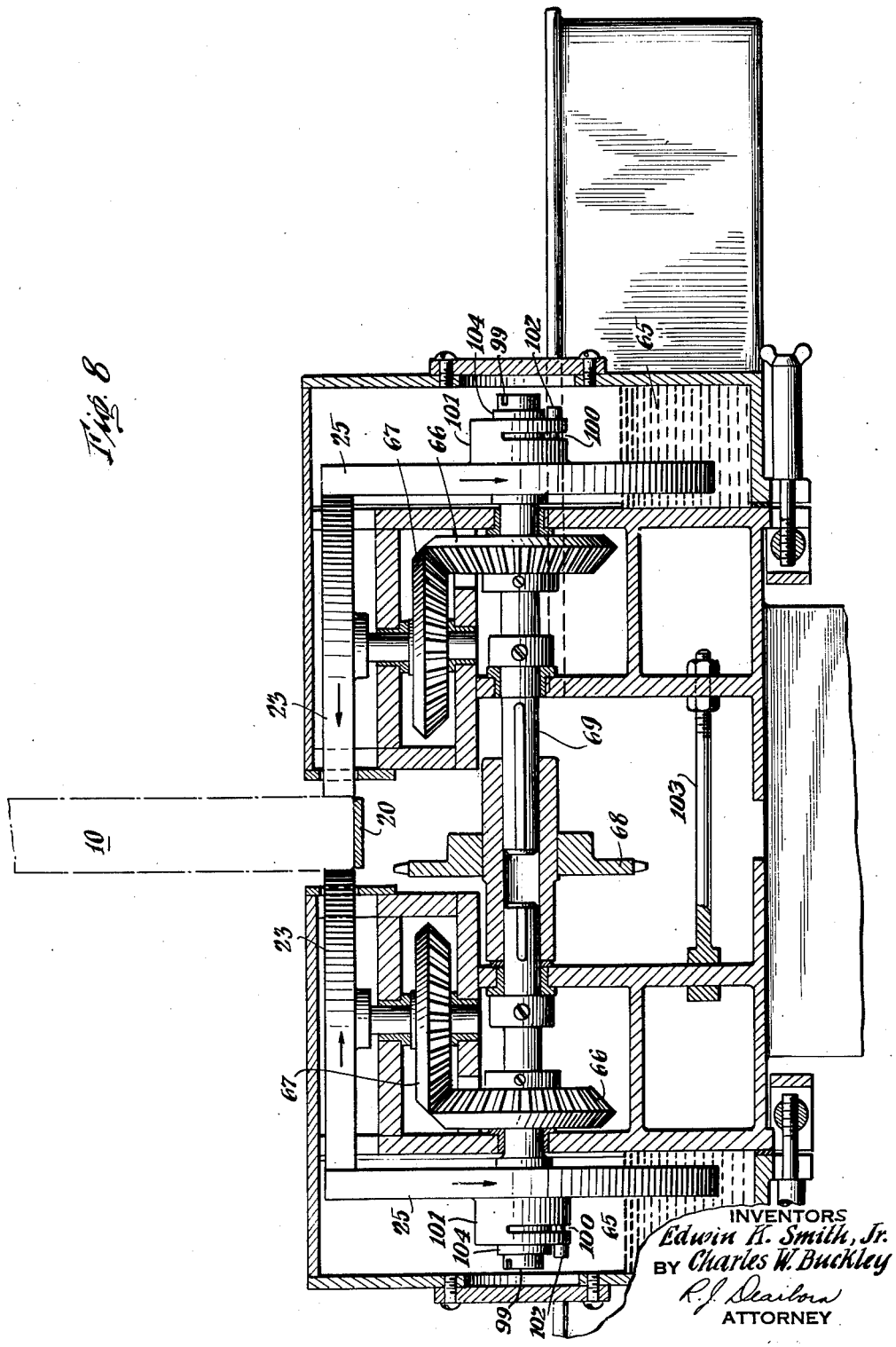

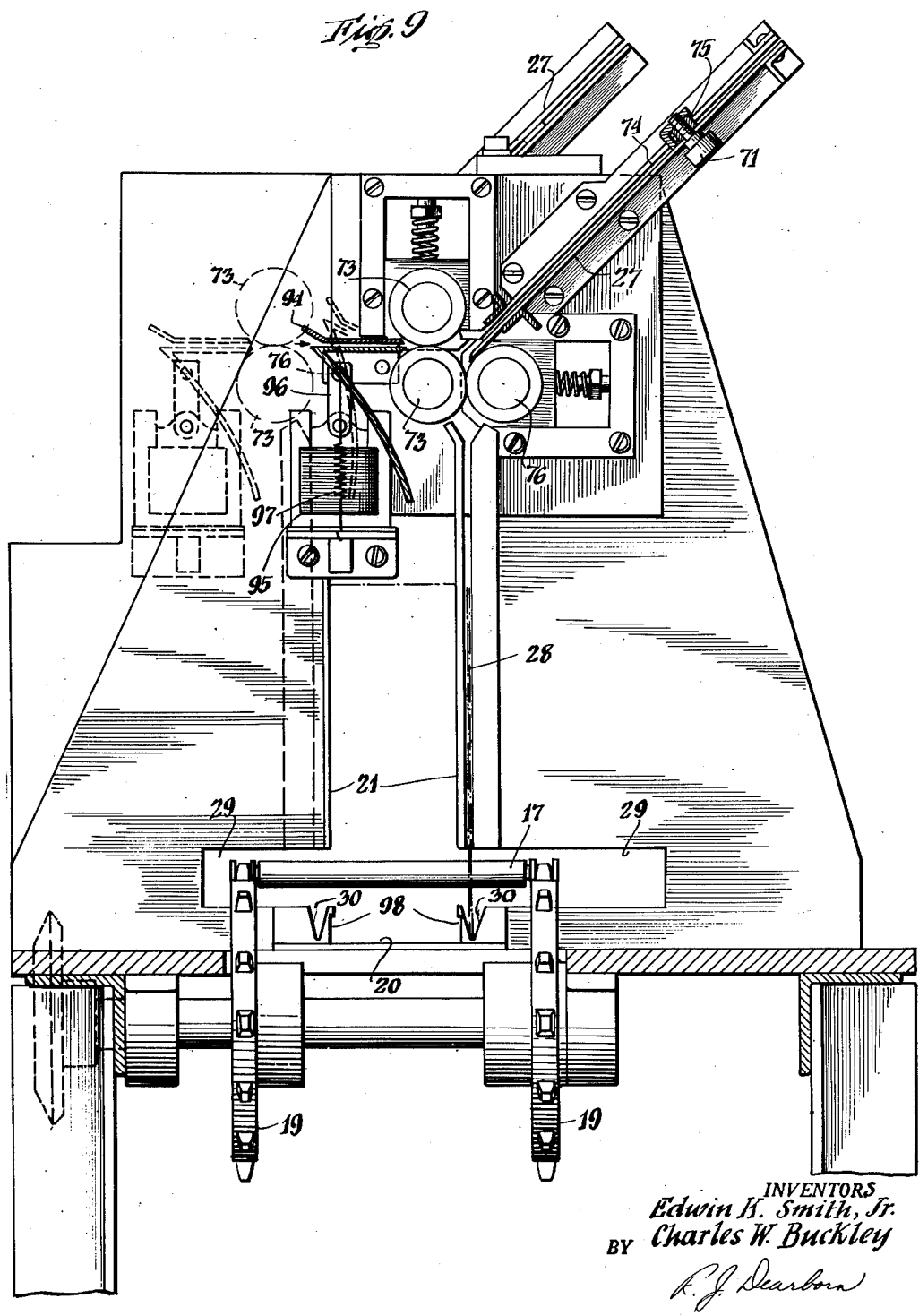

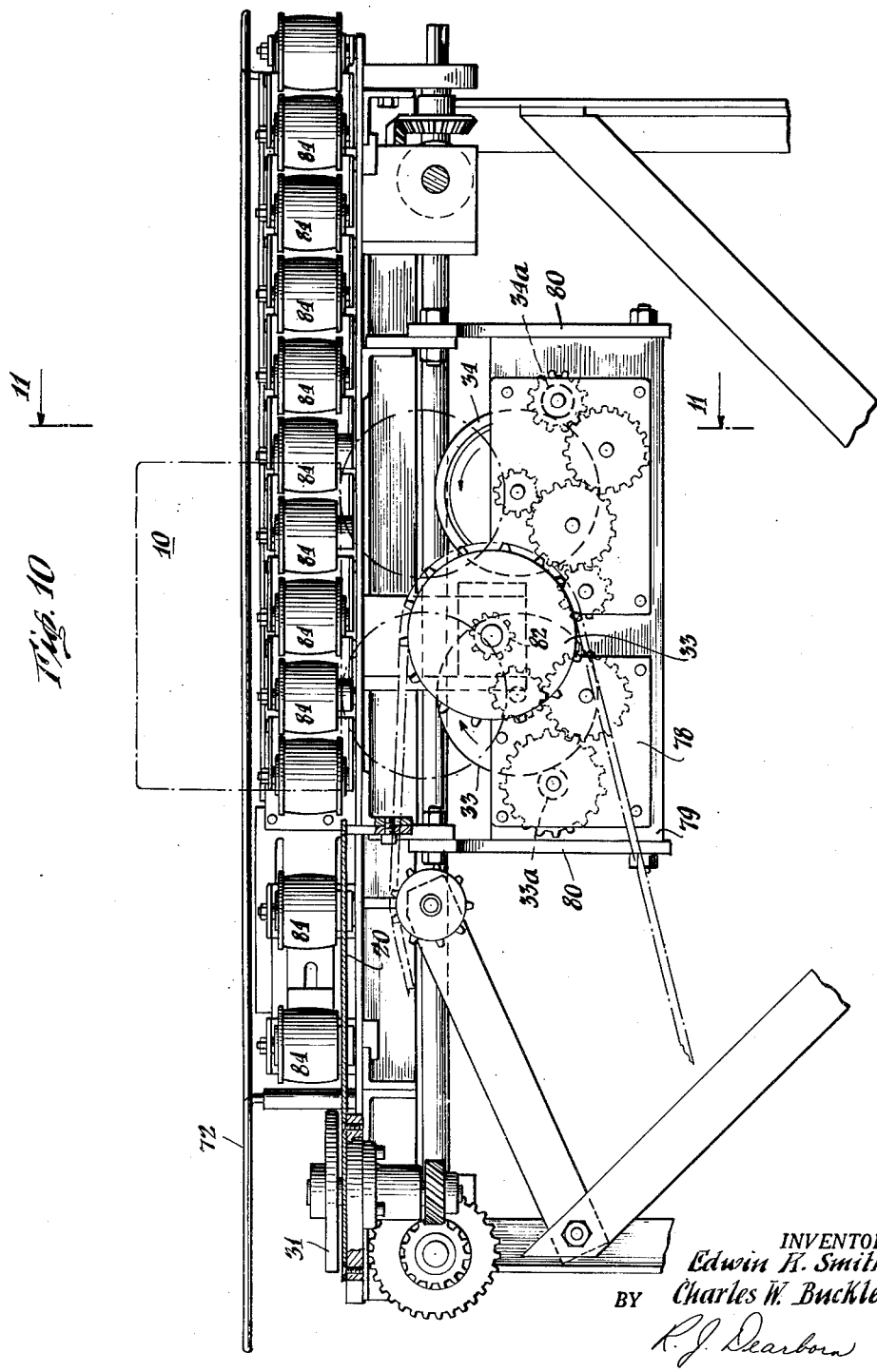

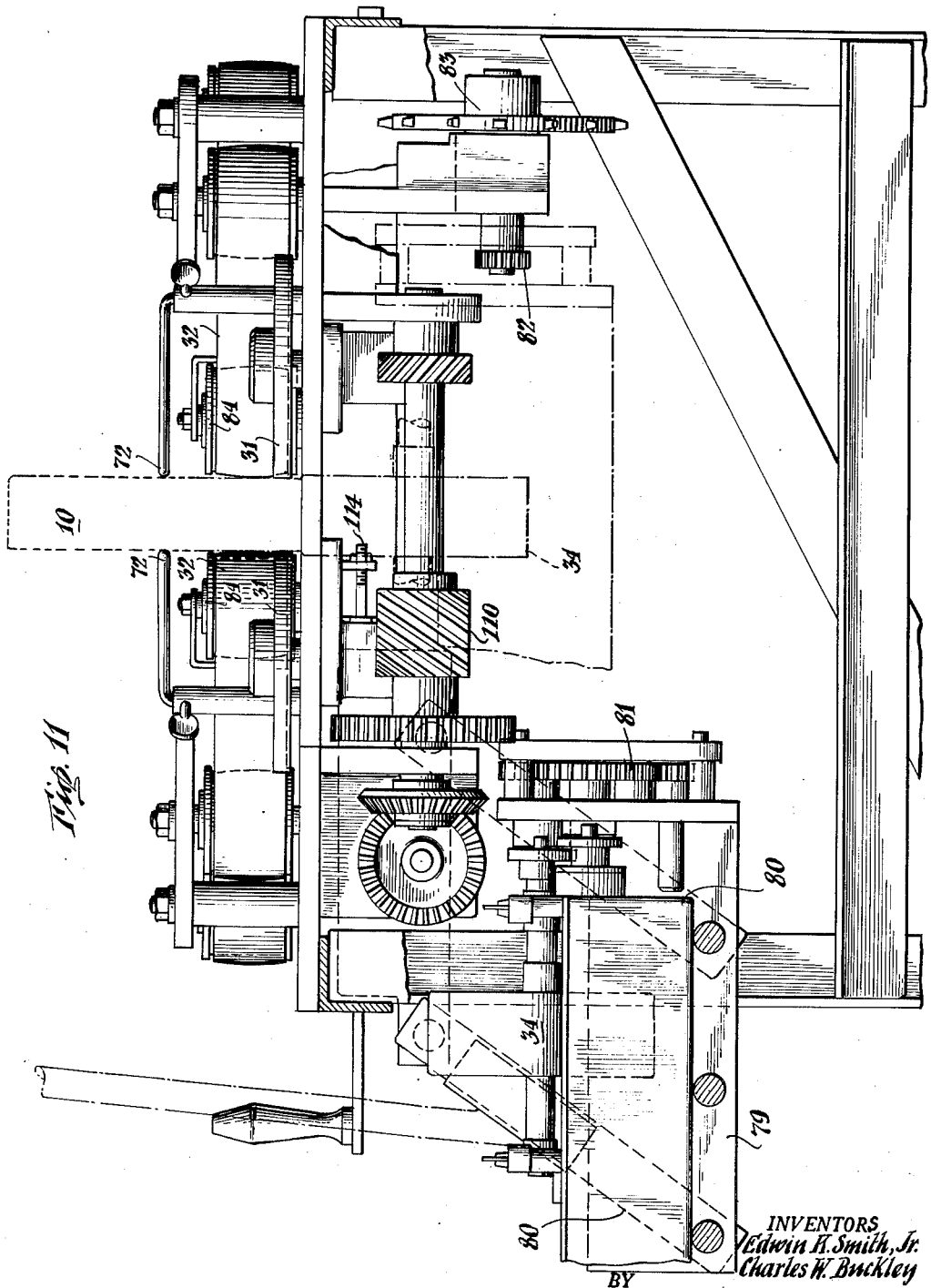

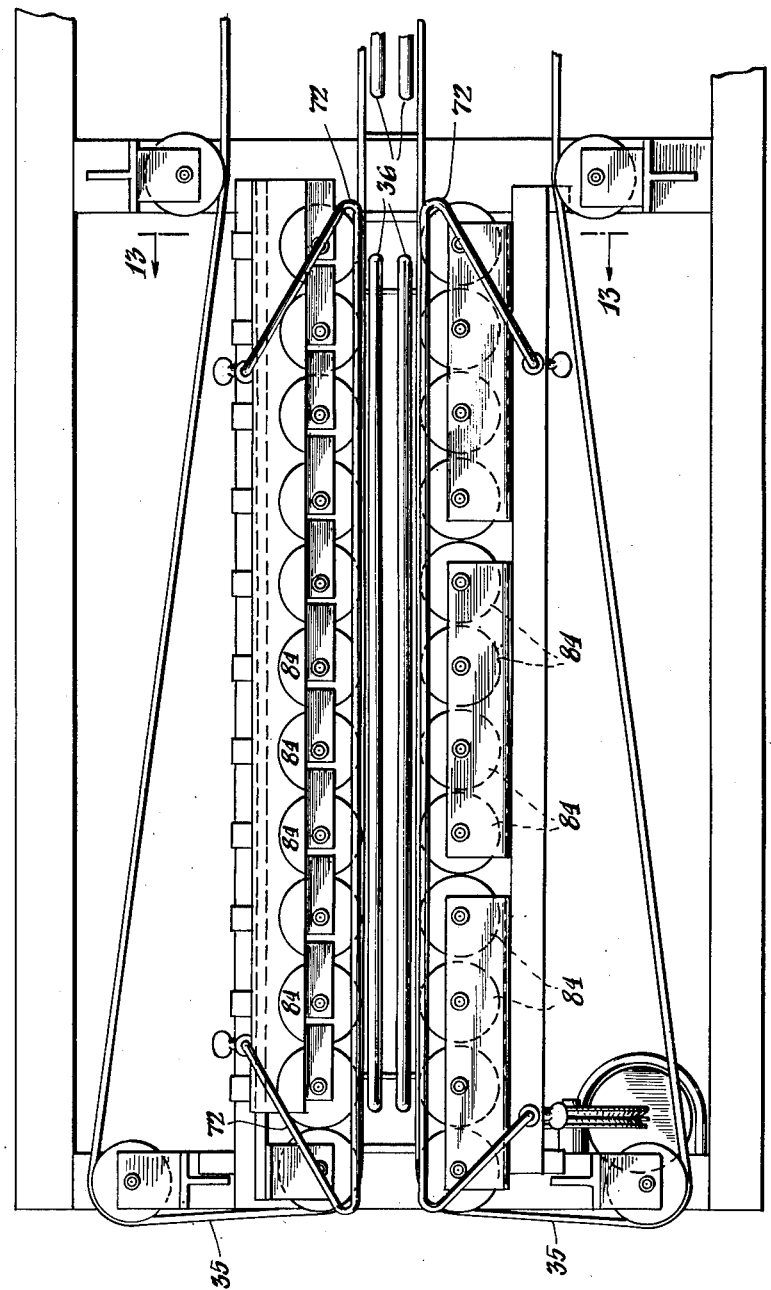

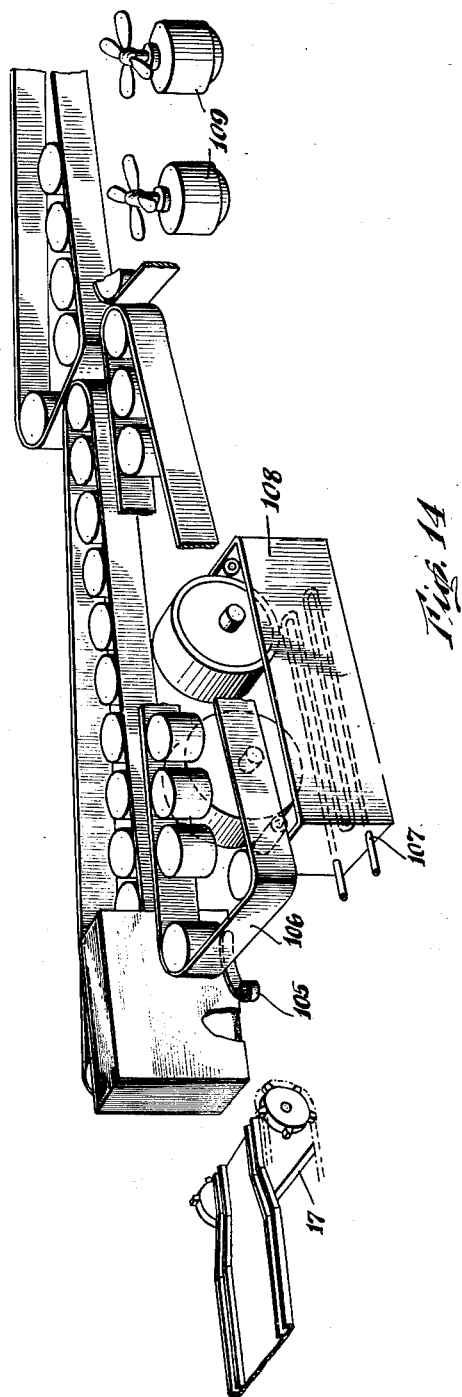

Patented Oct. 14, 1952

2,613,375

UNITED STATES PATENT OFFICE 2,613,375

APPARATUS FOR GLUING-OFF AND END SHEET PASTING

Edwin K. Smith, Jr., New York, and Charles W. Buckley, Mount Vernon, N. Y., assignors, by mesne assignments, to The de Florez Company, Inc., a corporation of Delaware Application December 17, 1948, Serial No. 65,764

4 Claims. (Cl. 11—1)

This invention relates to bookbinding and more particularly to the method and apparatus for applying gluing-off adhesive to the sewn back of a page block and the drying thereof, and to the applying of end sheets to the page block.

An important object of this invention is to eliminate the time-consuming operations which are associated with the pasting of end sheets to page blocks and gluing-off the sewn backs of page blocks. The present processes of effecting these operations include separately folding the end sheets and pasting them by hand or in a separate magazine-fed pasting machine to the front and back of the signatures of the book before the latter are gathered and sewn into book form. The gluing-off operations include hand feeding the page blocks to a machine which jogs the backs into a level position and then applies a layer of latex emulsion or hot-melt plastic to glue-off the sewn backs of the books, in order to bind the signatures into firm but flexible backs. The glued-off books are then stacked by hand on pallets, and thereafter the pallets are moved through a suitable oven for drying the adhesive.

An important purpose of this invention is to provide a single apparatus in which successive page blocks may be continuously advanced and the operations of aligning the page blocks, pasting the end sheets to the outer signatures of the page blocks, gluing-off the sewn edges of the page blocks, and drying the gluing-off adhesive may be carried out. To effect this purpose the page blocks are passed along a predetermined path and into engagement with the means for accomplishing the several operations, these means being positioned at sequential locations along the path of advancement of the page blocks.

A further object is to so combine the several operations as to reduce the hand labor involved and increase the rapidity of the operations and increase the volume of books which may be processed in a given time. An additional object of the invention is to eliminate the waste resulting from mishandling.

A still further object of this invention is to provide an apparatus of a continuous operational type which may be readily combined and made an integral part of a continuous type book manufacturing process.

Other objects of the invention and the advantages flowing from the use of the apparatus and method of the invention will be noted from the description set forth below. For purposes of illustration and to more clearly describe the invention, reference is made to the drawings, in which:

Figs. 1a, 1b, 1c and 1d are schematic, perspective, sequential views of an apparatus embodying the principles of the invention;

Fig. 2 is a side elevation, partly in section, of the feed assembly of the apparatus;

Fig. 3 is a plan view, partly in section, taken along the line 3—3 in Fig. 2;

Fig. 4 is a plan view, partly in section, of the feed assembly as taken along the line 4—4 in Fig. 2;

Fig. 5 is a section through the apparatus taken along the line 5—5 in Fig. 2;

Figs. 6 and 7 are plan and side views respectively of the jogger assembly;

Fig. 8 is a section taken through the end sheet adhesive applicator as indicated by the line 8—8 in Fig. 1b;

Fig. 9 is a sectional view of the end sheet feed taken along the line 9—9 as indicated in Fig. 1b;

Fig. 10 is a side elevation of the apparatus as shown schematically in Fig. 1c;

Fig. 11 is a sectional view taken along the line 11—11 in Fig. 10;

Fig. 12 is a plan view of a portion of the apparatus shown in Fig. 1d;

Fig. 13 is a sectional view of the apparatus taken along the line 13—13 in Fig. 12, and Fig. 14 is a schematic perspective view of a modified form of the apparatus.

Referring first to Figs. 1a, 1b, 1c, 1d, a brief overall description of the operations and apparatus will be given in order to facilitate the comprehension of the invention.

Book page blocks 10, which are comprised of a plurality of signatures which have been sewn together, are placed side by side on belt conveyor 11 (Figs. 1a and 5), the sewn or binding edge of all the page blocks being placed downward, that is, in contact with the belt conveyor 11. The belt conveyor 11 moves the page blocks laterally toward the machine to a perpendicular stop 12 (see Fig. 4), placing the end page block nearest the machine in the path of a cam-operated pusher 13. The continuously moving conveyor belt may be coated with a plastic or other suitable material to lower the sliding friction. The conveyor may also be operated intermittently to deliver the page blocks at periodic intervals. The pusher 13, being actuated by the cam 14, moves forward with a short stroke and thrusts each successive page block forward in the direction of the machine. The page block is moved forward sufficiently to be placed between the four vertical rollers 15 and 16, which are rotating and draw the page block toward the machine and feed it to a pusher chain conveyor consisting of pusher bars 17 mounted on endless chains 18, which are carried and driven by sprockets 19. The pusher bars are round in shape and are rotatably mounted on the endless chains 18 so that they may rotate slightly when they come up into position against the rear end of the page block, to avoid scuffing the block as the latter moves forward from the rollers 16. As each page block is moved along it is supported by a floor plate 20 and vertical sides 21.

Each successive page block is conveyed along in the straight line path, defined by the sides 21, into contact with and over jogger rollers 22 which are located at approximately the level of floor 20 in the path of the page blocks. The jogger rollers have non-circular configurations and, in the present embodiment, comprise a set of four rollers of substantially square cross-section which are disposed in line along the path of the page blocks. The jogger rollers 22 rotate in opposite directions to each other, and as the page block is advanced over the rollers it is jogged so that its constituent signatures are brought into alignment in a level position to facilitate the applying of an even coating of adhesive to the sewn page block in the gluing-off process. An opening is provided in the floor 20 at the point where the jogger rollers are positioned.

As the page block advances beyond the jogger rollers, it is again supported by the floor 20 and advances between adhesive applying discs 23, which are rotating at the same speed and in the direction of the advancing page blocks and apply a narrow coat of adhesive 24 to the outside signatures of the page block along the lower edge, that is, the edge adjacent to the sewn or binding edge, of the page block. Adhesive is supplied to the discs 23 by transfer discs 25, as will be more fully described below.

End sheets 26 are fed at proper intervals into buckle plate folders 27 (see Fig. 9) and are dropped into vertical chutes 28, which are positioned on either side of the path of the page block. Transverse slots 29 are provided near the bottom of the vertical chutes 28 and are sized to permit the passage of the pusher bars 17 therethrough. The end sheets 26, which have been dropped down the vertical chutes 28, are advanced by the pusher bar 17, which is propelling the page block 10. The end sheets move along V-shaped channels 30, which converge on the path of the page block (see Fig. 1b), and they are thus brought into contact with the page block and particularly into contact with the narrow adhesive band along the bottom edges of the outside signatures. The page block, with the end sheets thus in position, passes between side rollers 31, which are disposed on either side of the path of the page block and apply sufficient pressure to the page block along the bottom edge thereof to press the end sheets into adhesive contact with the narrow adhesive band which has been applied to the outside signatures of the page block.

The page block, with the end sheets thus adhesively attached to it, is advanced along the path into engagement with the belt conveyor shown in Fig. 1c, which consists of two belts 32 running vertically parallel in the direction initiated by the pusher bar conveyor. The page block is engaged and held firmly on each side by belt pressure and requires no bottom support. As the page block is advanced through the belt conveyor 32, it passes over a glue-off assembly, positioned below its path, which consists of two main rollers 33, 34, each with a driven doctor roller, as will be described. The roller 33 is a non-resilient roller and may be made of any suitable metal such as brass. Roller 33 applies a measured amount of adhesive to the sewn back of the page block and is rotated in the direction of the book; its peripheral speed being the same as the speed of the advancing page block. The second roller, or roller 34, is resilient and may be covered with a suitable material such as soft rubber. The roller 34 rotates in the opposite direction to the movement of the page block, that is, in the opposite direction to the applicator roller 33. The second roller 34 wipes off all excess adhesive from the back of the book and, further, presses adhesive into the crevices between the signatures for better binding.

The page block with the adhesive applied to its sewn edge, is advanced along additional belt conveyors comprising vertically parallel conveying belts 35 which hold the page block firmly on each side by belt pressure and continue to advance it along the path and carry it over electric heaters and reflectors 36, which are positioned directly below and along the path of the page block. The reflectors and their associated electric heaters 36 may be lowered, manually or automatically, and moved out of their position directly below the machine in order to prevent fire in case of stoppages. These belts may be adapted to move the books forward at slower speed than the other conveyors associated with the machine and reduce the distance between the page blocks thereby, thus adding to the drying time for a given distance of travel. As each page block advances beyond the electric heaters 36, and while still in a vertical position, it is transferred from the side conveyor belts 35 to the bottom conveyor belt 37, which carries the page block forward between vertical sides 38, 39. As the page block is advanced along the conveyor belt 37 the vertical side 39 terminates and the vertical side 38 encroaches diagonally on the path of the page block and inclines slightly out of the vertical position so as to tip the page block over on its side and onto two parallel conveying belts 40 of equal speed which have a space between them to facilitate taking page blocks off by hand. The speed of these belts can be varied with relation to the machine speed in order to vary the distance between books for purposes of stacking. With regard to the discharge belts 37 and 40, it will be noted that the belt 37 generally must travel faster than the drying belts 35 in order to attain sufficient clearance between the page blocks to permit the toppling action on to conveyor belt 40 because the page blocks as they are received from the slower moving belts 35 are in close head-to-head order. The belt 35 is so arranged that the page blocks overhang slightly on the inboard side, that is the side adjacent to side wall 39. The overhang has been found desirable to give a better toppling action. Thus, when each page block is started on its angular fall by the side plate 38 it transfers cleanly from belts 37 to belts 40. The speed of belts 40 may be suitably regulated so that the books, as they topple onto the belts are arranged for convenient handling. One satisfactory arrangement is to have the belts 40 moving at a speed such that each successive page block overlaps its predecessor. The overlapping arrangement permits easy handling of the books as they move out along belts 40.

Having thus described the apparatus and the operation in general, more detailed descriptions of the several work stations or assemblies along the path of the page block will now be considered. Referring to Figs. 2, 3, 4, 5, which present views of the stack feed assembly illustrated schematically in Fig. 1a, and referring particularly to Fig. 5, the conveyor belt 11 is inclined downward towards the machine (the horizontal dash line indicates the plane of the machine as a whole). The vertical rollers 15 and 16, the cam pusher 13, the cam 14, and the vertical stop 12 are tilted at an angle which corresponds to the incline of the conveyor belt 11. The page blocks, placed in side-by-side position with their binding edges downward, are kept in endwise alignment by the vertical sides 41, 42. The incline of the conveyor belt 11 and of the entire book feed assembly facilitates the loading of books on the conveyor belt for the incline of the belt keeps the end book from falling over on its side.

Side 42 is adjustable toward and away from the conveyor belt to accommodate page blocks of various lengths, adjustment being made by releasing bolts 43 (see Fig. 4) and moving the guide 42 either toward or away from the conveyor by sliding the supporting arm 44 along the slot 45 therein and resetting the bolt at the desired position. A similar adjustment of the cam pusher, for the length of the page block, can be made by moving the cam pusher assembly toward or away from the machine by releasing bolts 46 and sliding the assembly along slots 47 and resetting the bolts at the desired position.

The cam-operated pusher 13 has a horizontal reciprocating action with a relatively short stroke. As shown in Fig. 2 it is provided with page block contacting faces 48 which are sized to slide along the slots 49 provided in the vertical stop 12, which is positioned at the machine end of the conveyor belt 11. The cam pusher 13 is guided and supported by rollers 50 mounted on the cam pusher and arranged to move along trackways 51. Cam follower 52 is rotatably and slidably mounted in slot 53 of the cam pusher and is also mounted in the cam track 54. Cam 54 is actuated by drive wheel 55, which is geared to the periphery gear of the wheel 56 which carries the cam.

The rotation of wheel 56 causes cam 54 to draw the cam follower and the attached pusher through the eccentric path defined by the cam and to thereby impart to the cam pusher a horizontal and relatively short reciprocating stroke; the periodic movement of the cam pusher toward the machine propels successive page blocks between and into engagement with the vertical rollers 15 and 16, the faces 48 of the cam pusher 13 being of such width that they contact and propel forward only one page block at a time. The four perpendicular rollers 15 and 16 are spaced apart, two on each side of the path of the page block, so as to come into pressure engagement with the sides of the page block. They are rotated in the direction of the machine, so that, by their rotating pressure contact against the sides of the page block, they move the page block endwise in the direction initiated by the cam pusher 13. The rollers 15 and 16 are actuated by the drive wheel 57, which rotates in the direction indicated in Fig. 3. The perpendicular rollers 15 and 16 and their associated drives are laterally adjustable, to receive page blocks of various thicknesses, by releasing the bolts 58 and sliding the roller assemblies along the slots 59 to the desired position.

The page blocks are thereafter advanced along a path which is defined by the vertical side walls 21 and the floor 20, the page blocks being advanced by round pusher bars 17, which press against the rear of the page block near the floor 20, the pusher bars 17 being rotatably mounted between endless chains 18, which are supported and driven by sprockets 19. The page blocks are fed to the pusher bars 17 by the rollers 15 and 16 and are contacted by the pusher bars as they are emerging from the rollers 16. The transfer from the rollers 16 to the round pusher bars 17 is such that each page block is contacted by a pusher bar while it is still in motion as a result of the impetus given by the rollers and while the bar is traveling in a rotational direction around the chain sprockets 19. Such an arrangement avoids abrupt changes in acceleration of the page block during the transfer from the rollers to the pusher bars. It will be noted that the rollers 16 are relatively shorter than the rollers 15, to provide sufficient clearance for the pusher bars 17, their chains 18 and sprockets 19, as best shown in Fig. 2. Throughout the feed portion of the apparatus, the page blocks are at an angle to the level position of the machine, although they are continuously in a perpendicular position with respect to the conveyor 11, the stop 12, the cam pusher 13, and the rollers 15 and 16, all of which are at an angle to the general plane of the machine, as indicated by the dashed line in Fig. 5. To bring the page block into a vertical upright position with respect to the general horizon of the machine, the portion 60 of the side wall is slightly inclined at the end nearest the vertical rollers 16 and curves gently to the vertical upright position of the walls 21, urging the page block 10 into the vertical position as it is advanced along the path.

Each page block as it is advanced along the path defined by the walls 21 and the floor 20 moves into engagement with jogger rollers 22, the floor 20 terminating at a point slightly in advance of the jogger rollers and the jogger rollers being positioned in the path of and below the page block and substantially at the level of the floor 20. The jogger rollers may be square or of any other suitable noncircular cross-section such that they will impart a bumping or jogging action to the page blocks as they are rotated. Referring to Figs. 6 and 7, it will be noted that the joggers illustrated are substantially square, with slightly bevelled edges to prevent any damage to the page blocks as the jogger rollers 22 are rotated and the page blocks are moved thereover. It has been found desirable to rotate the jogger rollers in opposite directions to each other, that is, the rollers adjacent to each other are rotated in opposite directions. However, other rotational patterns are also satisfactory. They may also be rotated at different speeds by a suitable arrangement of the gears. As shown in Fig. 6, the joggers are driven by chain 18, which is one of conveyor assembly chains, and sprocket 62, the sprocket 62 being mounted on the hub 63 of the initial jogger roller 22, the subsequent jogger rollers being geared directly one with another by gears 64 mounted directly on the axes of the respective jogger rollers. A belt and sheave drive also has been found practical as a driving means for the joggers. Each page block as it advances over the jogger rollers 22 is bumped or jogged up and down vertically to effect a leveling or an alignment of the sewn signatures of the page block.

After the page block leaves the jogger roller station, it is again supported by the floor 20, the page block thereafter advancing between adhesive applying discs 23 which are positioned on either side of the path and contact the outside signatures of the page block in a narrow strip along the lower edge of the page block, adjacent to the binding or sewn edge and apply a narrow band of adhesive 24 along that edge. The adhesive applying discs 23 rotate in the direction in which the page block is traveling, and the peripheral speed of the discs is the same as the speed of the advancing page block. The discs 23 are supplied with adhesive by vertically disposed transfer discs 25 which are partially submerged in the glue reservoirs 65 and carry the adhesive up to the adhesive applicator discs and transfer the adhesive to said applicator discs by a rolling contact made between said discs. The discs themselves are not in actual physical contact for a gap is provided between the discs. The adhesive bridges the gap between the discs and transfers from discs 25 to discs 23. Vertical discs 25 are laterally adjustable to vary the gap between the discs in order to control the basic amount of adhesive transferred, this amount being subject to further doctoring prior to contacting the page blocks. Referring to Fig. 8, slots 100 are provided in the hubs 101 of the discs 25, with set screws 102 disposed in the hubs 101 parallel to the shaft 69 and adapted to span the slots 100. The discs 25 may be moved laterally on the bushings 104, which are secured in position on shaft 69 by screw 99, to adjust the clearance with the discs 23. After the discs 25 have been suitably adjusted the set screws 102 are tightened to lock the hubs 101 in the desired positions on the shaft 69. Each disc 25 rotates in the direction indicated by the arrows with respect to its associated disc 23; this rotation is effected through bevel gears 66 and 67, which are mounted respectively on the axes of the discs 25 and 23. The discs 25 and 23 are actuated by an endless chain mounted on sprocket 68, which in turn is mounted on the shaft 69 which carries discs 25 and bevel gear 66. The discs 23 can be laterally adjusted to receive page blocks of different thicknesses, the adjustment being accomplished by moving one glue pot laterally by means such as the screw adjustment 103 shown in Fig. 8, the shaft 69 being in two parts to allow the lateral adjustment.

The page block is then advanced to the end sheet receiving station, at which two unfolded end sheets 26 have been fed between their respective feed rollers 73, as shown in Fig. 9, into buckle plate folders 27, the sheets having been slid up slots 74 to the stop 75 and thereafter buckled and folded and drawn down through folding rollers 76, which are in rolling contact with the lower of the feed rollers 73. The end sheets 26, after they passed through the folding rollers 76, dropped down vertical chutes 28, with their folded edges down, into V-shaped channels 30, where they are engaged by the pusher bar 17 moving the page block along the path, the pusher bar moving through the transverse slots 29. The end sheets are pushed forward in V-shaped channels 30, which are parallel to the path of the page block and converge on the path of the page block at 77 (see Fig. 1b). The end sheets are thus brought into contact with the outer signatures of the page block and the narrow adhesive band at the bottom of said outside signatures. From the point where glue is applied in narrow strips 24 until the end sheets move into contact with the strips, the page blocks are kept from sticking to the side walls 21 by providing recessed channels in the walls 21 adjacent the floor 20, as best shown in Fig. 9. The end sheets and page block are then advanced by the pusher bar 17 between narrow side rollers or wheels 31, which are positioned on either side of the path of the page block. The rollers 31 are so disposed that they exert a pressure against the end sheets such that the latter are pressed into adhesive contact with the narrow band of adhesive on the signatures of the page block, the rollers 31 are rotated in the direction in which the page block and end sheets are advancing, and the peripheral speed of the rollers is the same as that of the advancing page block. Suitable adjustment means, such a screw adjustment 114, as shown in Fig. 11, is provided to permit the rollers to be laterally adjusted to receive page blocks of various thicknesses and also to adjust the pressure against the page blocks being processed. The worm drive gear 110 is sufficiently wide to permit the lateral adjustment.

After leaving the side rollers 31 the page block with the end sheets in adhesive contact therewith is introduced between the vertically parallel belts 32 which support and convey the page block by pressure against its sides.

It has been found that a suitable sealing of the end sheets also may be effected by stationary spring loaded sealing elements placed along the path of the page block. When such stationary sealing elements are substituted for the side rollers 31, the vertical side belts 32 are extended to a point one book length from the last contact with the pusher bars 17. The spring-loaded sealing elements 105, as shown in Fig. 14, may be placed immediately below the belts 106, corresponding to the belts 32 in Fig. 1c, for sealing the end sheets to the page block while all are moved forward by the belts. The pusher bar 17, which has advanced the page block through the machine to this position, moves out of engagement with the page block as it is received between the belts 32 or 106.

The floor 20 continues a short distance after the belts 32 have moved into engagement with the page blocks, but terminates at the gluing-off station, which is best shown in Figs. 10 and 11.

The gluing-off station comprises a glue reservoir 78 in which are partially submerged the gluing-off rollers 33 and 34. A non-hygroscopic, high solid, quick drying adhesive has been found suitable for use in the reservoir. As previously described, roller 33 has a hard non-resilient surface and applies a coating of adhesive to the sewn edges of the page block and rotates in the direction of the advancing page block, and the roller 34 has a resilient contacting surface of soft rubber which rotates in a direction opposite to the advancing page blocks and has two functions, one to force the glue which has been applied to the sewn binding edge into and between the signatures; the second function is to wipe the excess glue from the binding edge of the page block. Each of these rollers has associated with it a smaller doctor roller moving in a direction opposed to that of the roller with which it is associated so that the surfaces of the large and small rollers in contact travel together. The function of the doctor roller 33a associated with the adhesive applying roller 33 is to regulate the amount of adhesive applied to the sewn edge of the page block. The doctor roller 34a associated with the wiper roller 34 operates to remove the excess adhesive from the roller 34. The wiper roller 34 rotates in the adhesive to prevent any drying or caking on the roller and the adhesive picked up by the wiper roller 34 is removed by its associated doctor roller 34a. During the gluing-off operation, the page blocks are supported and advanced by the belts 32, which are in pressure contact with the sides of the page block, there being no support below the page block. In order to give easy access to the gluing-off assembly, the glue reservoir 78 and the rollers 33 and 34 positioned therein are mounted in a carriage 79 which is supported by pivotally mounted links 80 so that the carriage may be swung down and out of operative position to the position as shown in Fig. 11. When the glue reservoir is in the lowered position, the entire reservoir may be removed from the carriage 79. When moved into operative engagement, the gear train 81 of the glue-off assembly meshes with the gear 82 of the drive wheel 83.

The applying of adhesive to the binding edge of page blocks may be carried out in a number of ways other than that described in the foregoing paragraph.

In the illustrated form the adhesives used in the gluing-off operation are the conventional latices which are applied cold and are forced to dry at high speed by radiant heaters. However, it will also be appreciated that the apparatus can be adapted for the use of "hot melt" gluing-off adhesives which must be heated to liquid form in the glue-pot and solidified on the binding edge of the page block by exposure to circulating air. To effect the changeover for use of a hot melt adhesive in the present apparatus, heaters, such as the heating coils 107, shown in Fig. 14, would be applied to the removable glue reservoir 108, corresponding to the reservoir 78 in Figs. 10 and 11. The heating elements 36, shown in Figs. 1c, 1d and 12, would be replaced in the drying conveyor with suitable air circulating means such as the small electric fans or blowers 109, shown in Fig. 14.

As the page block advances beyond the gluing-off assembly, it passes between the vertically parallel belts 35 and out of engagement with the vertically parallel belts 32. The belts 35 also support and convey the page block by pressure against its sides, no support from below being required. The flat belts 32 and 35 are carried against idler rollers or pulleys 84 and when there are no books in the machine the belts naturally sag. However, the pulleys 84 are machined with a slight crown so that when a book passes through the belts the pressure exerted by the book through the belt, against the crowned pulleys, is sufficient to make the belts climb to a position centered on the pulleys and support the books at the proper level. Rods 72 positioned above the belts hold the pages of the page block together so that they do not tend to fan out as they are moved along by belts 32 and 35. The belts 35 advance the page block over a series of electric heaters and reflectors 36, which are positioned directly below the binding or sewn edge of the page block which has just received a coating of adhesive. The heaters are pivotally mounted at 86, as shown in Fig. 13, and may be swung down and away from their position directly below the path of the page block in order to prevent fire in case there is a stoppage of the machine, the heaters being moved down away from their operational position by movement of the handle 87, which is pivotally mounted to the frame apparatus at 88 and connected to the carriage 89, which supports the heaters, by the link 90, which is pivotally connected to the carriage 89 at 91 and to the handle assembly at 92. During operation of the machine the heaters may be suitably arranged for automatic lowering out of position when the machine stops from any cause, the handle 87 being provided to permit manual lowering of the heater assembly if desired.

The rollers 84 positioned along the sides of the path of the page blocks give a uniform pressure support to the page blocks as they are moved along by the belts 35, the belts 35 being kept under sufficient tension by means of adjustable tension take-up rollers 85. To insure sufficient support, pressure is exerted against the page blocks during the drying stage, it being desirable that the page blocks do not come into engagement with the electrical heaters 36 and thereby become burned. However, it has been found that the belts will maintain the page blocks in their proper vertical position with only a slight side pressure. The pressure necessary is sufficiently light so that a page block may be removed easily by hand from the conveyor at any point without disturbing the belts or the adjacent books. Each successive page block, after passing over the electric heaters, which effect the drying of the glue-off adhesive, is then received on conveying belt 37 and is advanced to the delivery point as described above.

At two points along the path which the page block travels are positioned reject means for rejecting page blocks in the one case and end sheets in another. The page block reject is located at 93 (see Figs. 1a and 6), in the floor 20 and, when actuated, a portion of the floor moves laterally leaving a hatchway through which the rejected page block drops. After a rejection the floor trap 93 is returned to its normal position by springs 112, shown in Figs. 1a and 6. The trap 93 is actuated by a solenoid mechanism 113, shown in Figs. 1a and 6, which operates to reject the page block in the event the end sheet feeder fails to feed either or both sheets. The end sheet reject operates, if, through some mechanical failure, neither or only one of the end sheets is fed to the end sheet folder. The presence or absence of sheets is detected on the paper feeder table (not shown) several feet in advance of the folder. The end sheet inspection is made in advance of the end sheet folder because if it is necessary to reject a page block because of the absence of one or both end sheets it is desirable to effect the rejection prior to the application of adhesive to the sides of the page block. If an end sheet is missing, the page block and the other end sheet are rejected, the end sheets being deflected from their normal path into a waste pile by tipping the end sheet feed slots 94 into the position shown by dashed line on Fig. 9. Each end sheet feed slot 94 is tipped up by the solenoid 95, linked to the end sheet feed slot 94 by the pivotally mounted link 96. After the solenoid has been actuated to tip the slots 94 and thereby deflect the end sheets into the waste pile, the end sheet feed slot is returned to its normal or full-line position shown in Fig. 9 by the spring 97. The presence or absence of both page block and/or end sheets may be detected and the rejects actuated by the usual photo-electric cell equipment or other suitable means.

It will be noted that all the operations of this invention are carried out on the successive page blocks as they pass through the machine with their binding edges down, the operations involving the binding edges and the outside signatures along their edges adjacent to the binding edge of the page block. There being little or no variation for different size books in this particular area, no vertical adjustment is required. However, the stops 75 on the folder plates 74 (see Fig. 9) must be reset to properly position the folds in the end sheets for books of different widths. The stops 75 are easily reset by releasing set screws 71.

When the bulk or the thickness of the book to be processed changes, certain adjustments are necessary along the path throughout the machine. These adjustments are all effected on one side of the machine as we have already noted with regard to the rollers 15 and 16, side adhesive applying discs 23 and side rollers 31. Similarly in the case of the side belts 32 and 35 the adjustment is made on one side by moving the entire supporting assembly for the side belts. This adjustment may be made by releasing set screws (not shown).

It should be noted that the apparatus for this invention is so designed that it can be used solely as an end sheet applying machine or if desired solely as a gluing-off machine. For example, if the long drying conveyor shown in Figs. 1c, 1d, 12 and 13 is removed and the discharge conveyor shown at the right hand side of Fig. 1d is placed adjacent to the end of the gluing unit, the machine would then be suitable for folding and pasting end sheets to page blocks. Such an end sheet machine may be utilized in applying end sheets to perfect bound books which have no need for back gluing.

Similarly by eliminating the end sheet folding and pasting operations shown in Figs. 1b, 8 and 9 and positioning the book feed conveyor assembly and the jogger assembly adjacent to the gluing-off assembly, the apparatus may be utilized as a gluing-off machine.

The process and apparatus set out in the specification and the invention embodied in the described apparatus efficiently fulfill the objects and purposes of the invention and provide an efficient and rapid continuous operational system for pasting end sheets to the outer signatures of the page blocks and gluing-off the sewn edges of the page blocks. The invention may be employed with equal advantage in the processing of thick or thin books.

This invention contemplates an entirely new concept in book manufacture in that the method and apparatus are based entirely on continuous operations on successive single work units. Prior gluing machines have glued books in groups of more than one depending upon the bulk of the book, the grouping of books for each operation requiring a considerable number of manual operations. The apparatus of this invention in which the books are handled singly after being received from a large book feed hopper eliminates the necessity for the manual labor involved in grouping and ungrouping books into multiples.

In accordance with the provisions of the patent statutes, the principles of this invention have been described together with the best mode of applying those principles. However, it should be understood that the structure disclosed is but one mode of utilizing the invention, and the structure disclosed is merely illustrative, for the invention may be carried out by other and alternative means. Also, while it is contemplated to use various features and elements in the combinations and relations described, some of these may be altered and modified in ways other than those suggested, without departing from the spirit and scope of the invention.

We claim:

1. In the manufacture of books, the apparatus for pasting end sheets to the outside signatures of page blocks and gluing-off the sewn edges of the page blocks, comprising, a jogger adapted to settle the signatures of the page block into alignment, adhesive applying means arranged to apply adhesive to the outside signatures in a narrow strip along the sides adjacent the sewn signature edge, means for conveying end sheets into position alongside the outside signatures, means to press the end sheets into adhesive contact with the adhesive coated portion of the signatures, a second adhesive applying means adapted to glue-off the sewn edge of the page blocks, a drier positioned to dry the glue which has been applied to said sewn edge, and means for continuously conveying the page blocks into position successively with the jogger, the several recited means and the drier.

2. In the manufacture of books, the apparatus for applying end sheets to the outside signatures of page blocks composed of several signatures which have been sewn together, and gluing-off the binding edges of the page blocks, comprising, conveying means for continuously advancing successive page blocks along a predetermined path into engagement with, a jogger adapted to align the signatures of the page block, adhesive applying means adapted to apply adhesive in a narrow strip to the outside signatures of the page block adjacent to the binding edges, a second conveying means for advancing successive end sheets into position alongside the outside signatures, means to press the end sheets into adhesive contact with the adhesive coated portion of the outside signatures, a second adhesive applying means adapted to glue-off the binding edge of the page blocks, and a drier positioned to dry the glue which has been applied to said binding edge.

3. In the manufacture of books, the apparatus for applying end sheets to the outside signatures of page blocks composed of several signatures which have been sewn together, and gluing-off the binding edges of the page blocks, comprising, a means for continuously conveying successive page blocks in a vertical upright position with their binding edges downward, endwise, along a predetermined path and into engagement with a jogger, an adhesive applying means adapted to apply a narrow strip of adhesive to the outside signatures along the edges which are adjacent to the binding edge of the page block, means for conveying and positioning successive pairs of end sheets into position alongside the outside signatures, means to press the end sheets into adhesive contact with the coated strips on the signatures, and a second adhesive applying means positioned below the path of the page blocks and adapted to glue-off the binding edge of the page blocks and a drying means also positioned below the path and adapted to dry the adhesive which has been applied to the binding edge.

4. In the manufacture of books, the apparatus comprising, conveying means for continuously advancing successive page blocks endwise in a vertical upright position with their binding edges downward along a predetermined path, a jogger operable on each advancing page block, adhesive applying means arranged to apply a narrow strip of adhesive to the outside sheets of each advancing page block adjacent to the binding edge of said page block, other conveying means for advancing end sheets into position alongside the outside sheets of each advancing page block, means to press the end sheets into adhesive contact with the strips of adhesive on the outside sheets of each advancing page block, other adhesive applying means arranged to apply adhesive to the binding edge of each advancing page block, and a drier arranged to dry the adhesive applied to the binding edge of each advancing page block.

EDWIN K. SMITH, Jr.
CHARLES W. BUCKLEY.

REFERENCES CITED

The following references are of record in the file of this patent:

UNITED STATES PATENTS

| Number | Name | Date |
| --- | --- | --- |
| 1,006,735 | Elredge | Oct. 24, 1911 |
| 1,023,569 | Juengst | Apr. 16, 1912 |
| 1,125,310 | Gullberg | Jan. 19, 1915 |
| 1,277,939 | Juengst | Sept. 3, 1918 |
| 1,315,888 | Welch | Sept. 9, 1919 |
| 1,380,265 | Story | May 31, 1921 |
| 1,458,447 | Skeppstedt | June 12, 1923 |
| 1,804,392 | Alger | May 12, 1931 |
| 1,819,030 | Kleineberg | Aug. 18, 1931 |
| 1,863,709 | Beall | June 21, 1932 |
| 1,865,086 | Cutler | June 28, 1932 |
| 1,986,039 | Ackley | Jan. 1, 1935 |
| 2,018,558 | Hotchkiss | Oct. 22, 1935 |
| 2,163,812 | Schramm | June 27, 1939 |
| 2,189,929 | Schramm | Feb. 13, 1940 |
| 2,227,346 | Holm | Dec. 31, 1940 |
| 2,346,575 | Hallowell | Apr. 11, 1944 |
| 2,414,386 | Olson | Jan. 14, 1947 |